US012121966B2

United States Patent
Shuck et al.

(10) Patent No.: US 12,121,966 B2
(45) Date of Patent: Oct. 22, 2024

(54) FUSED FILAMENT FABRICATION OF BRAZE ALLOYS

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

(*) Notice: Subject to any disclaimer, the term of this patent is extended or adjusted under 35 U.S.C. 154(b) by 154 days.

(21) Appl. No.: 17/095,201

(22) Filed: Nov. 11, 2020

(65) Prior Publication Data

US 2021/0146433 A1    May 20, 2021

Related U.S. Application Data

(60) Provisional application No. 62/935,385, filed on Nov. 14, 2019.

(51) Int. Cl.
  B22F 10/18    (2021.01)
  B22F 3/10    (2006.01)
  (Continued)

(52) U.S. Cl.
  CPC ............ B22F 10/18 (2021.01); B22F 3/1021 (2013.01); B22F 10/00 (2021.01); B29C 64/112 (2017.08);
  (Continued)

(58) Field of Classification Search
  CPC ................... B23K 15/086; B28B 1/001; B22F 2003/1057; C22C 1/023; C22C 1/0433; C22C 19/03
  See application file for complete search history.

(56) References Cited

U.S. PATENT DOCUMENTS

5,900,207 A * 5/1999 Danforth ............... C04B 35/638
  419/36
6,269,540 B1 * 8/2001 Islam ................. B23K 26/0608
  29/889.7

(Continued)

FOREIGN PATENT DOCUMENTS

CN    107096923 A    8/2017
CN    108393558 A    8/2018
(Continued)

OTHER PUBLICATIONS

Singamneni, S. et al. "Curved layer fused deposition modelling." 2010. Journal for new generation sciences. 8. 2. p. 95-107 (Year: 2010).*

(Continued)

Primary Examiner — Nicholas A Wang
(74) Attorney, Agent, or Firm — Shumaker & Sieffert, P.A.

(57) ABSTRACT

An additive manufacturing technique may include depositing, via a filament delivery device, a filament onto a surface of a substrate. The filament includes a binder and a powder including at least one metal or alloy and at least one braze alloy. The technique also includes sacrificing the binder to form a preform. The technique also includes sintering the preform to form a component including the at least one metal or alloy and the at least one braze alloy.

13 Claims, 4 Drawing Sheets

(51) Int. Cl.
*B22F 10/00* (2021.01)
*B29C 64/112* (2017.01)
*B29C 64/393* (2017.01)
*B33Y 10/00* (2015.01)
*B33Y 30/00* (2015.01)
*B33Y 70/10* (2020.01)
*B33Y 80/00* (2015.01)
*C22C 19/05* (2006.01)
*C22C 30/02* (2006.01)
*B29K 101/12* (2006.01)
*B29K 505/08* (2006.01)

(52) U.S. Cl.
CPC ............ *B29C 64/393* (2017.08); *B33Y 10/00* (2014.12); *B33Y 30/00* (2014.12); *B33Y 70/10* (2020.01); *B33Y 80/00* (2014.12); *C22C 19/056* (2013.01); *C22C 19/057* (2013.01); *C22C 30/02* (2013.01); *B22F 2301/15* (2013.01); *B29K 2101/12* (2013.01); *B29K 2505/08* (2013.01)

(56) References Cited

U.S. PATENT DOCUMENTS

| | | |
|---|---|---|
| 2002/0157737 A1* | 10/2002 | Chesnes ............... B23K 1/0018 148/528 |
| 2002/0159914 A1 | 10/2002 | Yeh |
| 2016/0042493 A1 | 2/2016 | Macmillan et al. |
| 2016/0298218 A1 | 10/2016 | Kilmer et al. |
| 2016/0354842 A1* | 12/2016 | Schick ................... B22F 7/062 |
| 2017/0252851 A1 | 9/2017 | Fulop et al. |
| 2018/0272451 A1 | 9/2018 | Perez et al. |
| 2018/0345396 A1 | 12/2018 | Kottilingam et al. |
| 2019/0105710 A1 | 4/2019 | Klett et al. |
| 2019/0389090 A1 | 12/2019 | Roy-Mayhew et al. |
| 2021/0146607 A1 | 5/2021 | Shuck et al. |
| 2022/0126402 A1 | 4/2022 | Smathers et al. |

FOREIGN PATENT DOCUMENTS

| | | |
|---|---|---|
| DE | 102016110337 A1 | 12/2017 |
| WO | 2016/012486 A1 | 1/2016 |
| WO | 2017132322 A2 | 8/2017 |

OTHER PUBLICATIONS

Tsai et al., "High-Entropy Alloys: A Critical Review," Materials Research Letters, vol. 2, No. 3, Apr. 2, 2014, pp. 107-123.
Senkov et al., "Refractory High-Entropy Alloys," Intermetallics, vol. 18, Jun. 23, 2010, pp. 1758-1765.
Senkov et al., "Mechanical Properties of Nb25Mo25Ta25W25 and V20Nb20Mo20Ta20W20 Refractory High Entropy Alloys," Intermetallics, vol. 19, Feb. 18, 2011, pp. 698-706.
U.S. Appl. No. 17/095,226, filed Nov. 11, 2020, by Shuck et al.
Extended Search Report from counterpart European Application No. 20204099.4, dated Feb. 25, 2021, 9 pp.
Chen et al., "Additive Manufacturing of High-Entropy Alloys: A Review", Entropy, vol. 20, No. 12, MDPI, Dec. 6, 2018, 18 pp.
Response to Extended Search Report dated Feb. 25, 2021, from counterpart European Application No. 20204099.4 filed Nov. 5, 2021, 11 pp.

* cited by examiner

FUSED FILAMENT FABRICATION OF BRAZE ALLOYS

This application claims the benefit of U.S. Provisional Application Ser. No. 62/935,385, entitled "FUSED FILAMENT FABRICATION OF BRAZE ALLOYS," and filed on Nov. 14, 2019, the entire content of which is incorporated herein by reference.

TECHNICAL FIELD

The disclosure relates to additive manufacturing techniques, in particular, to additive manufacturing of alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing presintered preforms and braze sintered performs using fused filament fabrication.

In some examples, the disclosure describes a technique that includes depositing, via a filament delivery device, a filament onto a surface of a substrate. The filament includes a binder and a powder including at least one metal or alloy and at least one braze alloy. The technique also includes sacrificing the binder to form a preform. The technique also includes sintering the preform to form a component including the at least one metal or alloy and the at least one braze alloy.

In some examples, the disclosure describes fused filament fabrication system. The fused filament fabrication system includes a substrate defining a surface; a filament delivery device; and a computing device. The computing device is configured to control the filament delivery device to deposit on the surface of the substrate a filament. The filament includes a binder and a powder including at least one metal or alloy and at least one braze alloy.

In some examples, the disclosure describes an additively manufactured component including a substrate defining a surface and at least one layer comprising at least one metal or alloy and at least one braze alloy formed on the surface of the substrate.

The details of one or more examples are set forth in the accompanying drawings and the description below. Other features, objects, and advantages will be apparent from the description and drawings, and from the claims.

DETAILED DESCRIPTION

Figure 1:
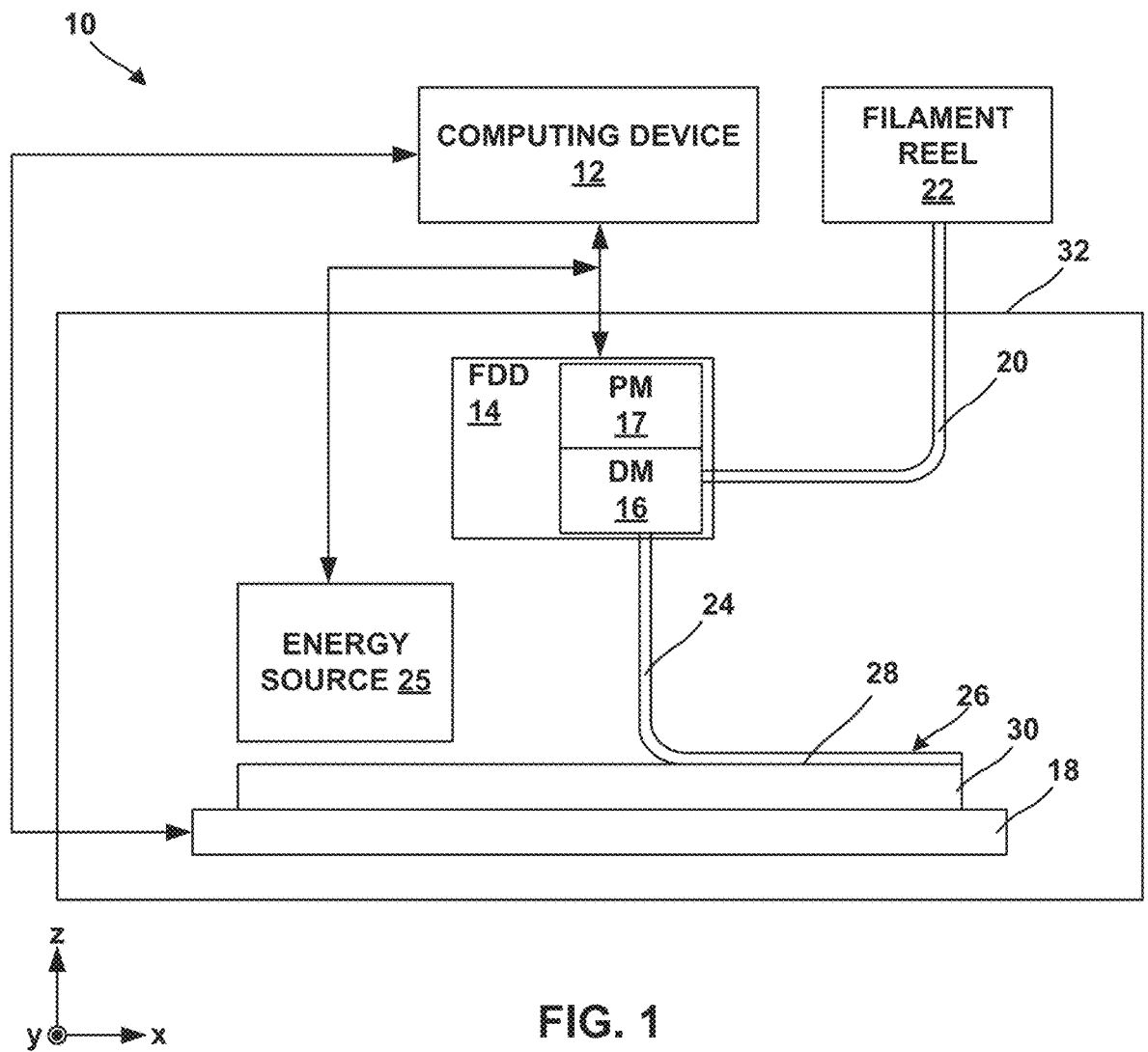
FIG. 1 is a conceptual block diagram illustrating an example system for forming an additively manufactured component by fused filament fabrication of a material including a metal or alloy powder, a braze alloy powder, and a binder.

The disclosure generally describes techniques for forming additively manufactured components using fused filament fabrication. Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including a metal powder and a braze alloy powder dispersed in the binder may be deposited using fused filament fabrication to form an additively manufactured component. Generally, the braze alloy powder may include any suitable alloy having a composition selected to, for example, wet the metal powder and/or a substrate surface, withstand selected service conditions of the component, or melt at a selected temperature, such as a lower temperature than the melting point temperature of the metal powder and/or the substrate. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

In some examples, fused filament fabrication using a powder including a metal or alloy powder and a braze alloy powder may enable forming presintered preform (PSP), braze sintered preform (BSP), or components that include one or more braze alloys. The preforms or components may include unique two-dimensional or three-dimensional profiles or features. For example, the described systems and technique may be used to form entire components, or portions thereof, having pedestals, through-holes or other three-dimensional features, such as dual walled gas turbine engine blades. Additionally, or alternatively, a powder including a metal or alloy powder and a braze alloy powder that includes one or more melting point depressants, such as, for example, boron or silicon, may improve diffusion rates and/or improved interfacial reactions between powder particles compared to powders without melting point depressants. The improved diffusion rates and/or improved interfacial reactions between powder particles may reduce sintering time and/or reduce sintering temperature. The reduced sintering time and/or reduced sintering temperature may reduce process costs and/or improve mechanical properties and/or chemical properties of the final component. The systems and techniques described herein may be used to form components, such as components of high temperature mechanical systems, entirely formed from, or including portions of, fuse filament fabricated material integrally brazed through transient liquid phase bonding and, in some examples, with dense homogenous structures, rather than only solid state diffusion of a metal or alloy powder without a braze alloy powder.

FIG. 1 is a conceptual block diagram illustrating an example fused filament fabrication system 10 for performing fused filament fabrication to form an additively manufactured component including a powder, that includes at least one braze alloy powder, and a binder by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening point temperature or melting point temperature of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. For example, surface 28 of substrate 30 may define a more complex geometry, including simple or complex curves, overhangs, undercuts, internal cavities, through-holes, or the like. In some examples, substrate 30 may include at least a portion of a component of an aerospace system, a high temperature mechanical system, or a gas turbine engine, such as a compressor, a heat exchanger, a blade, a vane, a nozzle, a diffuser, a heat shield, a swirler, a case, a disk, a seal, or a fuel nozzle. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the metal or alloy powder and/or the braze alloy powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a metal or alloy powder, a braze alloy powder, and a binder configured to bind the powder particles in filament 20.

The powder including the metal or alloy powder and the braze alloy powder may include any suitable metal, alloy, or combination of two or more alloys for forming an additively manufactured component. The metal or alloy powder may having a melting point temperature that is greater than a selected braze temperature. In some examples, the metal or alloy powder may include a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy powder may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, WI In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy powder may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, MI. In some examples, the metal or alloy powder may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy powder may include a nickel based alloy available under the trade designation IN-738 or Inconel 738, or a version of that alloy, IN-738 LC, available from All Metals & Forge Group, Fairfield, NJ, or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy powder may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, WI.

In some examples, the braze alloy powder may include any suitable braze alloy or combinations of two or more braze alloys for forming an additively manufactured component. The braze alloy powder may having a melting point temperature at or below a selected braze temperature. In some examples, the braze powder composition includes an alloy or a mixture of alloys that melt at a temperature below about 1232° C. (about 2250° F.), with the alloy or mixture of alloys being selected so that the braze powder composition as a whole substantially melts at a temperature between about 1093° C. (about 2000° F.) and about 1204° C. (about 2200° F.).

In some examples, the braze powder composition may include one or more alloy powders and includes between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1204° C. (about 2200° F.). In some examples, the braze powder composition also includes up to about 1 wt. % each of at least one of Ti, W, Mo, Re, Nb, Hf, Pd, Pt, Ir, Ru, C, Si, P, Fe, Ce, La, Y, or Zr. In some examples the braze alloy powder comprises a mixture of two or more braze alloys. For example, a braze alloy powder may include (a) about 35% of a first braze powder including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second braze powder including about 42 wt. % Ni, about 31 wt. % Cr, about 26 wt. % Ta, and about 1 wt. % B, with a liquidus temperature of about 1232° C. (about 2250°

F.); and (c) about 20 wt. % of a third braze powder including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.). Table 1. Example braze powder composition.

The powder may include any suitable ratio of the metal or alloy powder and the braze alloy powder. For example, the powder may include between about 5 weight percent (wt. %) to about 95 wt. % metal or alloy powder and between about 5 wt. % to about 95 wt. % braze alloy powder. In one example, the powder may include 80 wt. % nickel alloy powder (such as, e.g., RMS-022 alloy) and 20 wt. % braze alloy (including, e.g., 8 wt. % RMS-023, 8 wt. % RMS-024, and 4 wt. % RMS-025). In selecting the proportions of the metal or alloy powder and the braze alloy powder, higher weight percentages of the metal or alloy powder may provide better mechanical properties in view of their reduced levels of boron, silicon, or both. Conversely, higher percentages of the braze powder may provide improved braze flow. A proper balance between mechanical properties and braze flow should be selected. In some examples, the powder composition may include a composition as indicated below in Table 1.

TABLE 1

Example power compositions.

| Element | Weight Percent |
|---|---|
| Carbon | 0.05-0.116 |
| Manganese | less than 0.082 |
| Silicon | 0.11-0.376 |
| Sulfur | less than 0.003 |
| Phosphorus | less than 0.013 |
| Chromium | 8.424-11.640 |
| Titanium | less than 0.018 |
| Boron | 0.284-0.835 |
| Aluminum | 4.8-5.8 |
| Tungsten | 2.675-4.232 |
| Molybdenum | 0.650-1.362 |
| Rhenium | 1.4-2.462 |
| Yttrium | less than 0.161 |
| Nickel | Balance (43.8-60.2) |
| Zirconium | less than 0.034 |
| Iron | less than 0.180 |
| Niobium | 0.04-0.213 |
| Tantalum | 7.184-8.942 |
| Vanadium | less than 0.093 |
| Copper | less than 0.10 |
| Hafnium | 0.690-1.386 |
| Magnesium | less than 0.007 |
| Oxygen | less than 0.084 |
| Nitrogen | less than 0.030 |
| Cobalt | 8.725-10.964 |
| Platinum | less than 0.242 |
| Total Other | less than 0.150 |

In some examples, "Total Other" elements indicated in Table 1 may include trace impurities, such as impurities that are difficult to eliminate from the powder composition. In some examples, a powder composition that includes higher Al content may possess improved high-temperature oxidation resistance properties compared to a powder with lower Al content. In some examples, a powder composition that includes higher Ta content may possess improve mechanical properties compared to lower Ta content. For example, without being bound to any particular theory, Ta may strengthen the gamma and gamma prime phases by increasing lattice mismatches. In some examples, a powder composition that includes a nickel superalloy and about 0.5 wt. % boron may have improved mechanical strength and weldability compared to a nickel superalloy without boron.

In some example, the metal or alloy powder and/or the braze alloy powder may have specific powder mesh sizes, and may be produced by induction melting the braze alloy or the superalloy powder, respectively, in vacuum or an argon atmosphere, followed by argon gas atomization. Each individual powder component may be analyzed to confirm the particle size and chemical compositions.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The powder including the metal or alloy powder and the braze alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the metal or alloy powder and the braze alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the metal or alloy powder, the braze alloy powder, and the sacrificial binder. In other examples, the heat to which the composition is exposed to form softened filaments 24 may initiate the curing reaction, and no additional energy source is used.

Filament 20 includes a selected amount of sacrificial binder and powder so that the material in roads 26 may include more than about 80% by volume of the metal or alloy powder and the braze alloy powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

Figure 2:
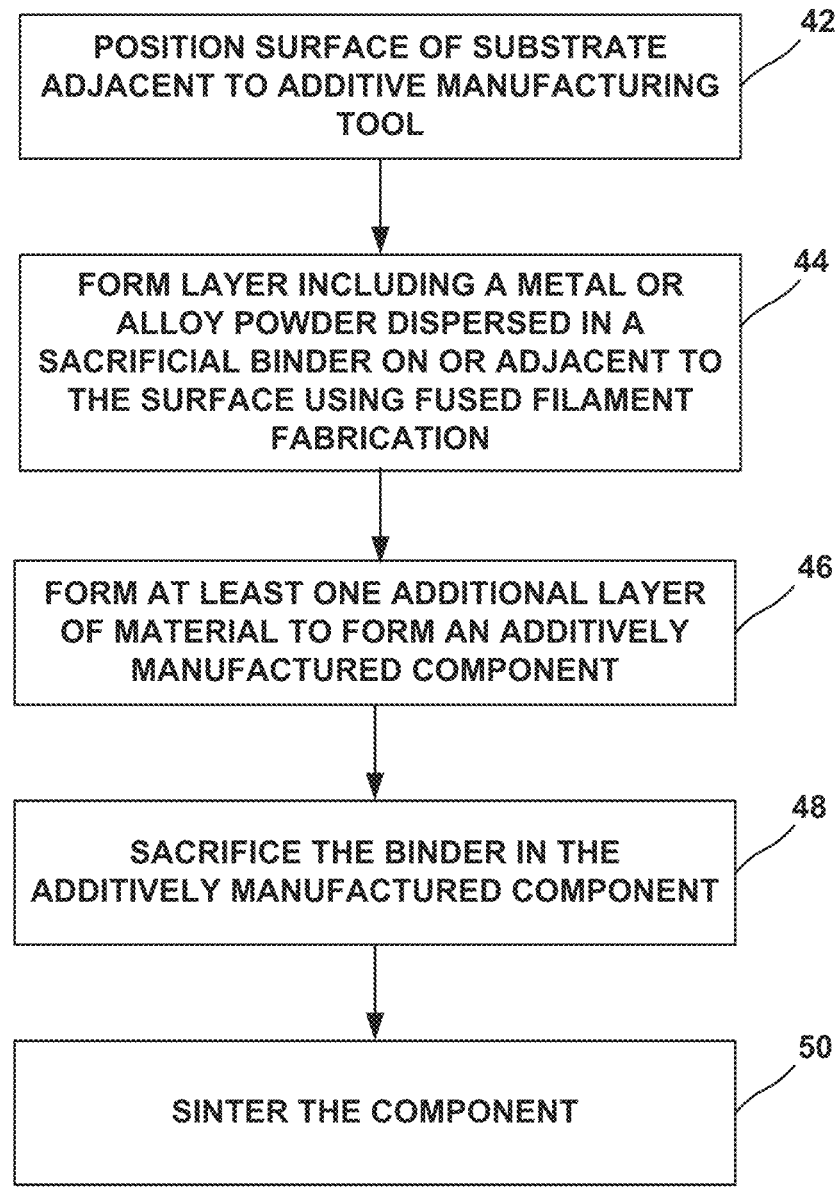
FIG. 2 is a flow diagram illustrating an example technique for forming an additively manufactured component using fused filament fabrication.

An example technique that may be implemented by system 10 will be described with concurrent reference to FIG. 2. FIG. 2 is a flow diagram illustrating an example technique for forming an additively manufactured component including at least one feature smaller than a base resolution of the additive manufacturing technique. Although the technique of FIG. 2 is described with respect to system 10 of FIG. 1, in other examples, the technique of FIG. 2 may be performed by other systems, such a system 30 including fewer or more components than those illustrated in FIG. 1. Similarly, system 10 may be used to performed other additive manufacturing techniques.

The technique of FIG. 2 includes positioning substrate 30 including surface 28 adjacent to a build position, e.g., on stage 18 (42). Although not shown in FIG. 2, in some examples, prior to positioning substrate 30, the technique may include inspecting and/or cleaning surface 28. In some examples, cleaning surface 28, such as by abrasive or chemical cleaning, may produce a stronger braze joint than uncleaned joint surfaces. In some examples, system 10 may not include a separate substrate 30, the technique of FIG. 2 may include positioning a build surface defined by stage 18, or by another component, or layers of prior softened filament 24 or another material.

The technique of FIG. 2 also includes forming a road 26 of material using fused filament fabrication (44). Computing device 12 may cause filament delivery device 14 to deposit softened filament 24 in one or more roads 26 to ultimately form an additively manufactured preform or component. A plurality of roads 26 defining a common plane may define a layer of material. Thus, successive roads 26 may define a series of layers, for example, parallel layers, and the series of layers may eventually define the additively manufactured preform or component.

The technique of FIG. 2 also includes forming, on roads 26 of material, at least one additional layer of material to form the additively manufactured preform or component (46). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (46). In this way, the technique may be used to form preforms or components may include three-dimensional profiles or features.

The technique of FIG. 2 includes, after forming the additively manufacturing component (46), sacrificing the binder from the component (48). The sacrificing (48) may include delivering thermal or any suitable energy, for example, by energy source 25, to roads 24 in an amount sufficient to cause binder to be substantially oxidized, incinerated, carbonized, charred, decomposed, or removed from roads 24, while leaving the metal or alloy powder and the braze alloy powder substantially intact. In other examples, the additively manufactured component may be placed in a furnace to heat the additively manufactured component and cause removal of the binder from the component (48). In some examples, a temperature sufficient to cause the binder to be removed from roads 24 may be less than the braze temperature of the braze alloy powder.

The technique of FIG. 2 also includes, after sacrificing the binder (48), sintering the component (50). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (50) may promote the bonding of particles of the powder to each other to strengthen the component including substantially only the powder after the binder is sacrificed. In some examples, the sintering (50) may not melt the particles of the metal or alloy powder, thus leaving the microstructure of the metal or alloy particles substantially intact. This may facilitate forming components with selected microstructures compared to techniques that include melting the powder. The sintering (50) may also densify an interior or a surface region of the component, for example, by promoting powder compaction and reducing porosity. In some examples, the steps of removing the sacrificial binder (48) and sintering the component (50) may be combined in a single heating step or series of heating steps, e.g., within a furnace.

In some examples, the sintering (50) may cause melting of at least a portion of the braze alloy powder and/or transient liquid phase bonding of one or more components of the braze alloy powder with particles of the powder, such as the metal or alloy powder. For example, the technique may include heating the powder to melt at least a portion of the braze alloy powder. In some examples, the powder may be heated in a furnace or other closed retort, and substrate 30 may be heated with the powder. In some examples, the furnace or closed retort may enclose a vacuum or substantially inert atmosphere (e.g., an atmosphere including constituents that substantially do not react with substrate 30 and/or the powder at the temperatures and pressures experienced by the interior of the furnace or closed retort). In some examples, the powder may be heated at a braze temperature of between about 1093° C. (about 2000° F.) and about 1288° C. (about 2350° F.), such as a braze temperatures of about 1260° C. (about 2300° F.). The time for which the powder is heated at the braze temperature may vary from about 10 minutes to about 60 minutes, for example between about 20 to 30 minutes.

Regardless of the heat treatment used for melting at least a portion of the braze alloy powder, the powder may be allowed to cool to ambient temperature to form a solid and join adjacent roads 26 and, optionally, roads 26 to substrate 30. For example, the powder may be cooled in a vacuum or inert gas furnace to about 650° C. (about 1200° F.) at a rate that is slow enough to avoid thermal distortion, followed by cooled under flowing inert gas to about 65° C. (about 150° F.) or less.

In some examples, the technique may optionally include a diffusion heat treatment cycle to substantially homogenize the additively manufactured material. As used herein, substantially homogenized means to homogenize as least to an extent as accepted in common high temperature alloy brazing techniques. For example, the diffusion heat treatment may be performed at temperatures between about 0° C. (about 0° F.) and about 222° C. (about 400° F.) below the braze temperature (e.g., below the highest braze temperature used in a stepped heat treatment), and for times of up to about 24 hours. For example, the post-brazing diffusion heat treatment cycle may include a stepped diffusion heat treatment cycle at a temperature of about 1149° C. (about 2100° F.) for about 1 hour to about 18 hours. In some examples, during the diffusion heat treatment, substrate 30 may be disposed in a vacuum or inert atmosphere. In some examples, the stepped diffusion heat treatment cycle may include heating substrate 30 including the powder at a rate of between about 11° C./minute (about 20° F./minute) and about 22° C./minute (about 40° F./minute) to a first temperature of between about 982° C. (about 1800° F.) and about 1093° C. (about 2000° F.). In some examples, substrate 30 may be held at the first temperature for about 30 minutes to about 4 hours. The stepped heat treatment may also include heating substrate 30 to a second temperature of between about 1038° C. (about 1900° F.) and about 1149° C. (about 2100° F.) at a rate of between about 5.6° C./minute (about 10° F./minute) and about 16.7° C./minute (about 30° F./minute). Substrate 30 may be held at the second temperature for between about 1 hour and about 4 hours. In some examples, the stepped heat treatment further includes heating substrate 30 to a third temperature of between about 1066° C. (about 1950° F.) and about 1177° C. (about 2150° F.) at a rate of between about 2.8° C./minute (about 5° F./minute) and about 11° C./minute (about 20° F./minute). Substrate 30 may be held at the third temperature for between about 1 hour and about 4 hours. The stepped heat treatment also may include heating substrate 30 to a fourth temperature of between about 1093° C. (about 2000° F.) and about 1204° C. (about 2200° F.) at a rate of between about 2.8° C./minute (about 5° F./minute) and about 11° C./minute (about 20° F./minute). Substrate 30 may be held at the fourth temperature for between about 6 hours and about 24 hours.

In some examples, substrate 30 may be heated at a rate of about 16.7° C./minute (about 30° F./minute) a first temperature of about 1038° C. (about 1900° F.) and held at about 1038° C. for about 1 hour to about 2 hours. Substrate 30 then may be heated to a second temperature of about 1093° C. (about 2000° F.) at a rate of about 11° C./minute (about 20° F./minute) and held at about 1093° C. for about 1 hour to about 2 hours. Substrate 30 then may be heated to a third temperature of about 1121° C. (about 2050° F.) at a rate of about 5.6° C./minute (about 10° F./minute) and held at about 1121° C. for about 1 hour to about 2 hours. Substrate 30 then may be heated to a fourth temperature of about 1149° C. (about 2100° F.) at rate of about 5.6° C./minute (about 10° F./minute) and held at about 1149° C. for about 1 hour to about 18 hours.

In some examples, the technique may include one or more additional processing steps including, but not limited to, hot isostatic pressing, stress relief, additional sintering, solutionizing, annealing, aging, tempering, machining, polishing, shot peening, laser shock peening, or coating. The one or more additional processing steps may provide desired mechanical properties, physical properties, thermal resistance, chemical resistance, or the like.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Figure 3:
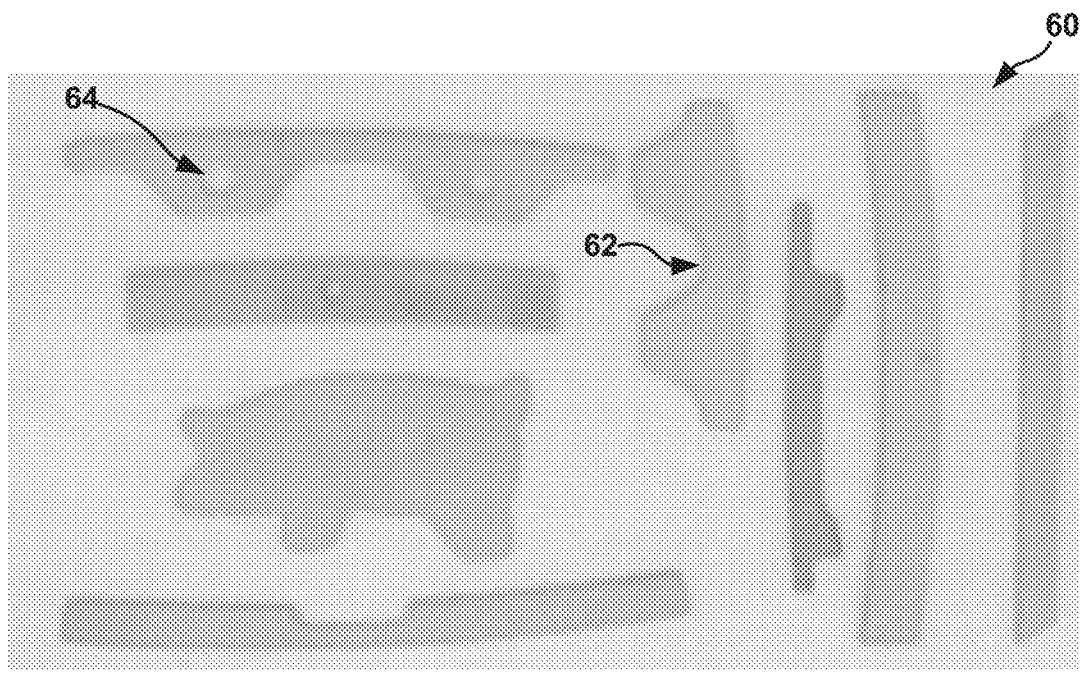
FIG. 3 is a photograph illustrating eight example two-dimensional preforms formed using the additive manufacturing techniques described herein.

Although FIG. 1 illustrates a simplified conceptual and schematic view of an example substrate 30 and road 26, in other examples, substrate 30 and/or roads 26 may define a more complicated geometry. For example, FIG. 3 is a photograph illustrating eight example two-dimensional preforms (collectively, "preforms 60) formed using the additive manufacturing technique described herein. The example preforms 60 define complex two-dimensional geometries, including curves 62 and through-holes 64, formed via additive manufacturing rather than machining or other subtractive manufacturing techniques. Forming the complex two-dimensional shapes of preforms 60 may reduce material waste and/or reduce processing time compared to subtractive manufacturing techniques.

Figure 4:
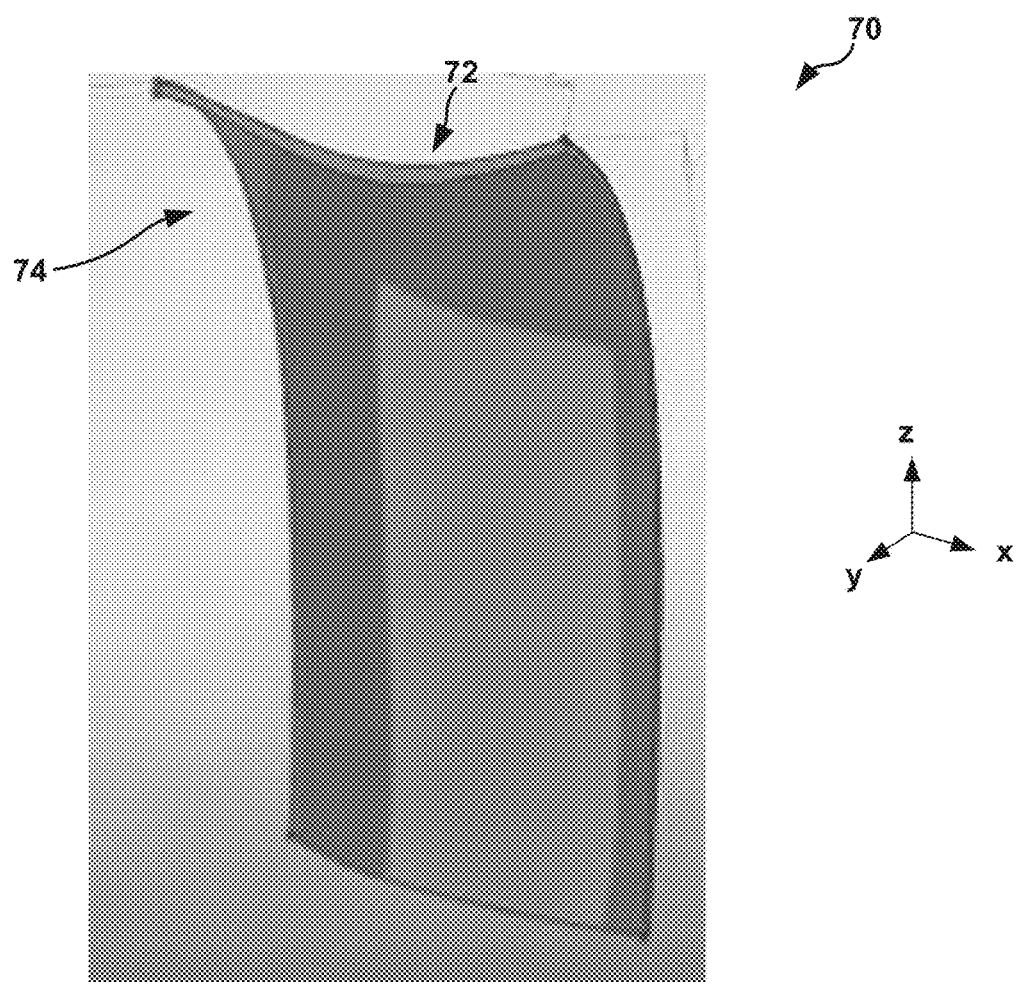
FIG. 4 is a conceptual diagram illustrating an example three-dimensional preform formed using the additive manufacturing techniques described herein.

FIG. 4 is a conceptual diagram illustrating an example three-dimensional preform 70 formed using the additive manufacturing technique described herein. Preform 70 includes a curve 72 in the x-y plane and a curve 74 in the z-y plane. Forming the three-dimensional shape of preform 70 using the describe additive manufacturing techniques may reduce material waste and/or reduce processing time compared to subtractive manufacturing techniques.

Figure 5A:
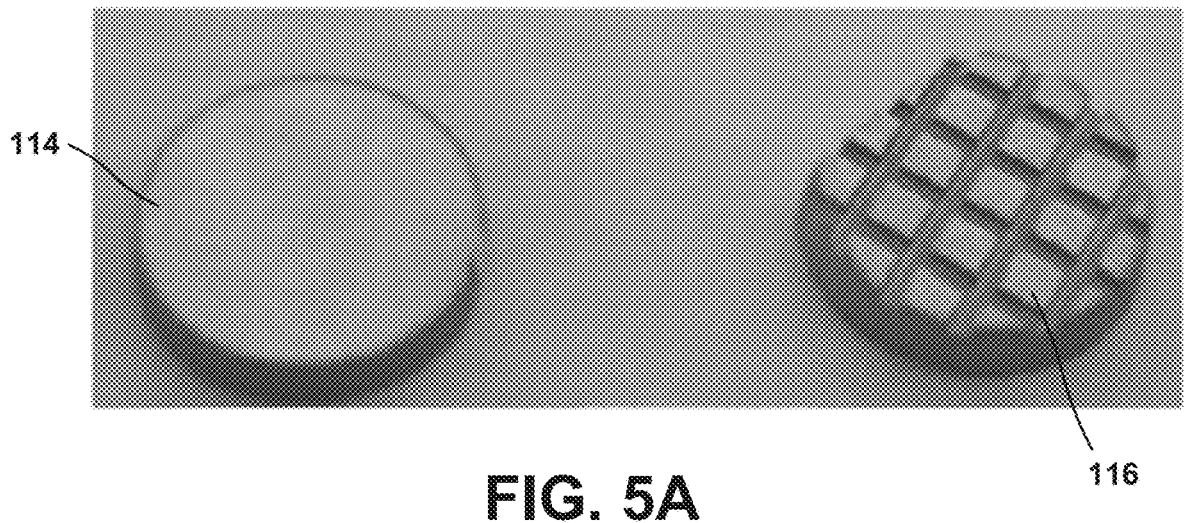
FIGS. 5A and 5B are photographs illustrating an example BSP material having three-dimensional surface features and a repaired vane airfoil including the BSP material having the three-dimensional surface features.
Figure 5B:
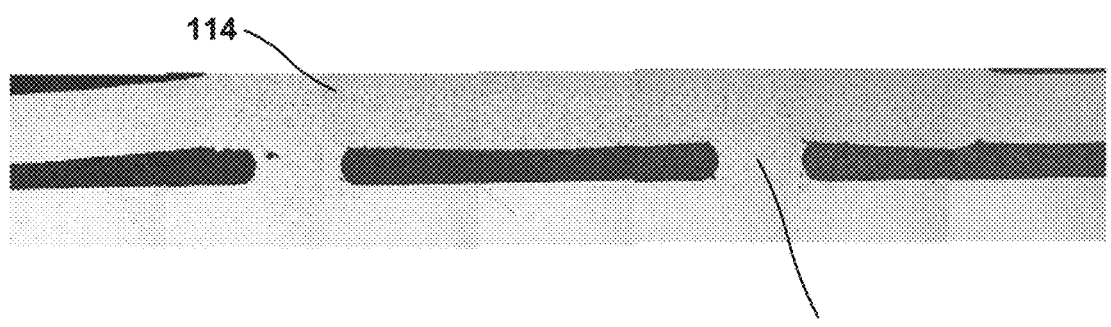

FIGS. 5A and 5B are photographs illustrating an example preform 114 having three-dimensional surface features 116 and a repaired vane airfoil including the preform 114 having the three-dimensional surface features 116. Forming the three-dimensional surface features 116 of preform 114 using the describe additive manufacturing techniques may reduce material waste and/or reduce processing time compared to subtractive manufacturing techniques.

The following clauses illustrate example subject matter described herein.

Clause 1. A method comprising: depositing, via a filament delivery device, a filament onto a surface of a substrate, wherein the filament includes a binder and a powder including at least one metal or alloy and at least one braze alloy; sacrificing the binder to form a preform; and sintering the preform to form a component including the at least one metal or alloy and the at least one braze alloy.

Clause 2. The method of clause 1, wherein the at least one metal or alloy comprises a nickel-base alloy or cobalt-based alloy.

Clause 3. The method of clause 1 or 2, wherein the at least one braze alloy comprises at least one of boron or silicon.

Clause 4. The method of any one of clauses 1 through 3, wherein a composition of the powder comprises between about 0.05 wt. % and about 0.116 wt. % carbon, less than about 0.082 wt. % manganese, between about 0.11 wt. % and about 0.376 wt. % silicon, less than about 0.003 wt. % sulfur, less than about 0.013 wt. % phosphorus, between about 8.424 wt. % and about 11.64 wt. % chromium, less than about 0.018 wt. % titanium, between about 0.284 wt. % and about 0.835 wt. % boron, between about 4.8 wt. % and about 5.8 wt. % aluminum, between about 2.675 wt. % and about 4.232 wt. % tungsten, between about 0.65 wt. % and about 1.362 wt. % molybdenum, between about 1.4 wt. % and about 2.462 wt. % rhenium, less than about 0.034 wt. % zirconium, less than about 0.18 wt. % iron, between about 0.04 wt. % and about 0.213 wt. % niobium, between about 7.184 wt. % and about 8.942 wt. % tantalum, less than about 0.093 wt. % vanadium, less than about 0.1 wt. % copper, between about 0.69 wt. % and about 1.386 wt. % hafnium, less than about 0.007 wt. % magnesium, less than about 0.084 wt. % oxygen, less than about 0.03 wt. % nitrogen, between about 8.725 wt. % and about 10.964 wt. % cobalt, less than about 0.242 wt. % platinum, and between about 43.8 wt. % and about 60.2 wt. % nickel.

Clause 5. The method of any one of clauses 1 through 4, wherein the powder comprises between about 5 weight percent (wt. %) and 95 wt. % of the at least one metal or alloy powder and between about 95 wt. % and about 5 wt. % of the at least one braze alloy.

Clause 6. The method of any one of clauses 1 through 5, wherein the binder comprises a polymer selected from the group consisting of a thermoplastic, a curable polymer, polyvinyl alcohols, polyolefins, polystyrenes, acrylonitrile butadiene styrene, polylactic acids, thermoplastic polyurethanes, and aliphatic polyamides.

Clause 7. The method of any one of clauses 1 through 6, wherein the filament comprise at least about 80 volume percent (vol. %) of the powder including the at least one metal or alloy and the at least one braze alloy.

Clause 8. The method of any one of clauses 1 through 7, wherein sintering the preform comprises: heating the preform to a braze temperature of the at least one braze alloy; cooling the heated preform; and diffusion heat treating the cooled preform to substantially homogenize the powder of the preform.

Clause 9. The method of any one of clauses 1 through 8, wherein sacrificing the binder comprises delivering energy from an energy source to the deposited filament in an amount sufficient to cause the binder to be substantially oxidized, incinerated, carbonized, charred, decomposed, or removed from the filament to form the presintered perform.

Clause 10. An additive manufacturing system comprising: a substrate defining a surface; a filament delivery device; and a computing device configured to control the filament delivery device to deposit on the surface of the substrate a filament, wherein the filament includes a binder and a powder including at least one metal or alloy and at least one braze alloy.

Clause 11. The system of clause 10, further comprising an energy source, wherein the computing device is further configured to control the energy source to deliver energy to the deposited filament to sacrifice the binder to form a preform.

Clause 12. The system of clause 10 or 11, further comprising an energy source, wherein the computing device is further configured to control the energy source to: heat the preform to a braze temperature of the at least one braze alloy; cool the heated preform; and diffusion heat treat the cooled preform to substantially homogenize the powder of the preform.

Clause 13. The system of any one of clauses 10 through 12, wherein the at least one metal or alloy comprises a nickel-base alloy or cobalt-based alloy.

Clause 14. The system of any one of clauses 10 through 13, wherein the at least one braze alloy comprises at least one of boron or silicon.

Clause 15. The system of any one of clauses 10 through 14, wherein a composition of the powder comprises between about 0.05 wt. % and about 0.116 wt. % carbon, less than about 0.082 wt. % manganese, between about 0.11 wt. % and about 0.376 wt. % silicon, less than about 0.003 wt. % sulfur, less than about 0.013 wt. % phosphorus, between about 8.424 wt. % and about 11.64 wt. % chromium, less than about 0.018 wt. % titanium, between about 0.284 wt. % and about 0.835 wt. % boron, between about 4.8 wt. % and about 5.8 wt. % aluminum, between about 2.675 wt. % and about 4.232 wt. % tungsten, between about 0.65 wt. % and about 1.362 wt. % molybdenum, between about 1.4 wt. % and about 2.462 wt. % rhenium, less than about 0.034 wt. % zirconium, less than about 0.18 wt. % iron, between about 0.04 wt. % and about 0.213 wt. % niobium, between about 7.184 wt. % and about 8.942 wt. % tantalum, less than about 0.093 wt. % vanadium, less than about 0.1 wt. % copper, between about 0.69 wt. % and about 1.386 wt. % hafnium, less than about 0.007 wt. % magnesium, less than about 0.084 wt. % oxygen, less than about 0.03 wt. % nitrogen, between about 8.725 wt. % and about 10.964 wt. % cobalt, less than about 0.242 wt. % platinum, and between about 43.8 wt. % and about 60.2 wt. % nickel.

Clause 16. The system of any one of clauses 10 through 15, wherein the powder comprises between about 5 weight percent (wt. %) and 95 wt. % of the at least one metal or alloy powder and between about 95 wt. % and about 5 wt. % of the at least one braze alloy.

Clause 17. The system of any one of clauses 10 through 16, wherein the binder comprises a polymer selected from the group consisting of a thermoplastic, a curable polymer, polyvinyl alcohol, polyolefins, polystyrene, acrylonitrile butadiene styrene, polylactic acid, thermoplastic polyurethanes, and aliphatic polyamides.

Clause 18. An additively manufactured component comprising: a substrate defining a surface; and at least one layer comprising at least one metal or alloy and at least one braze alloy formed on the surface of the substrate.

Clause 19. The component of clause 18, wherein the component comprises at least a portion of a turbine engine component selected from the group consisting of compressor, heat exchanger, blade, vane, nozzle, diffuser, heat shield, swirler, case, disk, seal, or fuel nozzle.

Clause 20. The component of clause 18 or 19, wherein a microstructure of the layer comprises substantially homogenous microstructure.

Various examples have been described. These and other examples are within the scope of the following claims.

What is claimed is:

1. A method comprising:
depositing, via a filament delivery device, a filament onto a surface of a substrate, wherein the filament includes a binder and a powder including at least one metal or alloy and at least one braze alloy, and wherein a composition of the powder comprises between about 0.284 wt. % and about 0.835 wt. % boron;
sacrificing the binder to form a three-dimensional preform, the three-dimensional preform comprising one or more of a through-hole or a dual walled gas turbine engine blade preform; and
sintering the preform to form a component including the at least one metal or alloy and the at least one braze alloy, wherein sintering the preform comprises a stepped diffusion heat treatment comprising:
heating the preform at a rate of about 16.7° C./minute to a first temperature of about 1038° C., wherein the preform is held at the first temperature for about 1 hour to about 2 hours;
heating the preform at a rate of about 11° C./minute to a second temperature of about 1093° C., wherein the preform is held at the second temperature for about 1 hour to about 2 hours;
heating the preform at a rate of about 5.6° C./minute to a third temperature of about 1121° C., wherein the preform is held at the third temperature for about 1 hour to about 2 hours; and
heating the preform at a rate of about 5.6° C./minute to a fourth temperature of about 1149° C., wherein the preform is held at the fourth temperature for about 1 hour to about 18 hours.

2. The method of claim 1, wherein the at least one metal or alloy comprises a nickel-base alloy or cobalt-based alloy.

3. The method of claim 1, wherein a composition of the powder comprises between about 0.05 wt. % and about 0.116 wt. % carbon, less than about 0.082 wt. % manganese, between about 0.11 wt. % and about 0.376 wt. % silicon, less than about 0.003 wt. % sulfur, less than about 0.013 wt. % phosphorus, between about 8.424 wt. % and about 11.64 wt. % chromium, less than about 0.018 wt. % titanium, between about 0.284 wt. % and about 0.835 wt. % boron, between about 4.8 wt. % and about 5.8 wt. % aluminum, between about 2.675 wt. % and about 4.232 wt. % tungsten, between about 0.65 wt. % and about 1.362 wt. % molybdenum, between about 1.4 wt. % and about 2.462 wt. % rhenium, less than about 0.034 wt. % zirconium, less than about 0.18 wt. % iron, between about 0.04 wt. % and about 0.213 wt. % niobium, between about 7.184 wt. % and about 8.942 wt. % tantalum, less than about 0.093 wt. % vanadium, less than about 0.1 wt. % copper, between about 0.69 wt. % and about 1.386 wt. % hafnium, less than about 0.007 wt. % magnesium, less than about 0.084 wt. % oxygen, less than about 0.03 wt. % nitrogen, between about 8.725 wt. % and about 10.964 wt. % cobalt, less than about 0.242 wt. % platinum, and between about 43.8 wt. % and about 60.2 wt. % nickel.

4. The method of claim 1, wherein the powder comprises between about 5 weight percent (wt. %) and 95 wt. % of the at least one metal or alloy powder and between about 95 wt. % and about 5 wt. % of the at least one braze alloy.

5. The method of claim 1, wherein the binder comprises a polymer selected from the group consisting of a thermoplastic, a curable polymer, polyvinyl alcohols, polyolefins, polystyrenes, acrylonitrile butadiene styrene, polylactic acids, thermoplastic polyurethanes, and aliphatic polyamides.

6. The method of claim 1, wherein the filament comprise at least about 80 volume percent (vol. %) of the powder including the at least one metal or alloy and the at least one braze alloy.

7. The method of claim 1, wherein sintering the preform comprises:
heating the preform to a braze temperature of the at least one braze alloy;
cooling the heated preform; and
diffusion heat treating the cooled preform to substantially homogenize the powder of the preform.

8. The method of claim 1, wherein sacrificing the binder comprises delivering energy from an energy source to the deposited filament in an amount sufficient to cause the binder to be substantially oxidized, incinerated, carbonized, charred, decomposed, or removed from the filament to form the presintered perform.

9. The method of claim 1, wherein the surface of the substrate is a curved surface.

10. The method of claim 1, wherein the composition of the powder comprises about 0.5 wt. % boron.

11. The method of claim 1, wherein a composition of the powder comprises between about 22.5 wt. % and about 24.35 wt. % chromium, between about 9 wt. % and about 11 wt. % nickel, between about 6.5 wt. % and about 7.5 wt. % tungsten, less than about 0.65 wt. % carbon, between about 3 wt. % and about 4 wt. % tantalum, and balance cobalt.

12. The method of claim 1, further comprising one or more additional processing steps including one or more of stress relief, additional sintering, or machining.

13. A method comprising:
depositing, via a filament delivery device, a filament onto a surface of a substrate, wherein the filament includes a binder and a powder including at least one metal or alloy and at least one braze alloy;
sacrificing the binder to form a three-dimensional preform, the three-dimensional preform comprising a dual walled gas turbine engine blade preform; and
sintering the preform to form a component including the at least one metal or alloy and the at least one braze alloy, wherein sintering the preform comprises a stepped diffusion heat treatment comprising:
heating the preform at a rate of about 16.7° C./minute to a first temperature of about 1038° C., wherein the preform is held at the first temperature for about 1 hour to about 2 hours;
heating the preform at a rate of about 11° C./minute to a second temperature of about 1093° C., wherein the preform is held at the second temperature for about 1 hour to about 2 hours;
heating the preform at a rate of about 5.6° C./minute to a third temperature of about 1121° C., wherein the preform is held at the third temperature for about 1 hour to about 2 hours; and
heating the preform at a rate of about 5.6° C./minute to a fourth temperature of about 1149° C., wherein the preform is held at the fourth temperature for about 1 hour to about 18 hours.

* * * * *